US00RE36586E

United States Patent [19]

Abondance et al.

[11] E Patent Number: Re. 36,586

[45] Reissued Date of Patent: Feb. 29, 2000

[54] SHAPED SKI OF NON-RECTANGULAR CROSS SECTION

[75] Inventors: Roger Abondance, La Murette; Jean Bauvois, Villars De Lans; Jean-Marc Forneri, Saint Sauveur, all of France

[73] Assignee: Skis Rossignol S.A., Voiron, France

[21] Appl. No.: 09/189,838

[22] Filed: Nov. 12, 1998

Related U.S. Patent Documents

Reissue of:

[64] Patent No.: 5,292,148
Issued: Mar. 8, 1994
Appl. No.: 07/958,675
Filed: Oct. 9, 1992

[30] Foreign Application Priority Data

Nov. 19, 1991 [JP] Japan ..... 3-14750

[51] Int. Cl.[7] ..... A63C 5/048

[52] U.S. Cl. ..... 280/602; 280/608; 280/610

[58] Field of Search ..... 280/602, 608, 280/609, 610, 601

[56] References Cited

U.S. PATENT DOCUMENTS

| | | |
|---|---|---|
| 2,362,380 | 11/1944 | Kallstrom et al. . |
| 2,369,004 | 2/1945 | Andreef . |
| 3,272,522 | 9/1966 | Kennedy, III . |
| 3,372,943 | 3/1968 | Grossauer . |
| 3,580,596 | 5/1971 | Völkl . |
| 4,175,767 | 11/1979 | Scheruebl . |
| 4,300,786 | 11/1981 | Alley . |
| 4,671,529 | 6/1987 | LeGrand et al. . |
| 4,681,725 | 7/1987 | Maruyama . |
| 4,858,945 | 8/1989 | Kashiwa . |
| 4,911,462 | 3/1990 | Diard et al. . |
| 5,002,300 | 3/1991 | Pascal et al. . |
| 5,366,234 | 11/1994 | Rohrmoser . |
| 5,559,036 | 9/1996 | Abondance et al. . |

FOREIGN PATENT DOCUMENTS

| | | |
|---|---|---|
| 0 394 835 | 10/1990 | European Pat. Off. . |
| 0 490 044 | 6/1992 | European Pat. Off. . |
| 0 543 743 | 5/1993 | European Pat. Off. . |
| 1 207 145 | 2/1960 | France . |
| 1 459 879 | 11/1966 | France . |
| 2 476 495 | 8/1981 | France . |
| 2 522 976 | 9/1983 | France . |
| 2 611 518 | 9/1988 | France . |
| 2 611 519 | 9/1988 | France . |
| 2 615 404 | 11/1988 | France . |
| 1 478 169 | 8/1969 | Germany . |
| 4 328 840 | 3/1995 | Germany . |
| 86/05994 | 10/1986 | WIPO . |
| 91/08029 | 6/1991 | WIPO . |
| 91/09653 | 7/1991 | WIPO . |

OTHER PUBLICATIONS

Photograph A—Cross–sectional view (and enlargement) of the Blizzard V–Prestige ski sample (Mar., 1991).

Photograph B—Cross–sectional view of a first Blizzard ski sample (Mar., 1992).

(List continued on next page.)

*Primary Examiner*—Christopher P. Ellis
*Assistant Examiner*—Michael Mar
*Attorney, Agent, or Firm*—Oliff & Berridg, PLC

[57] ABSTRACT

A ski with a non-rectangular cross section has a filling core, for example made of polyurethane foam, a shell forming the upper face and at least a part of the lateral faces of the ski, a lower face equipped with longitudinal metal edges and with a central sliding sole. The ski includes two longitudinal reinforcement elements which extend at least in the binding mounting area of the ski and are arranged on either side of the core, each reinforcement element has a lower face which extends to a great extent over the width of an edge so as to afford it an effective support, and extends over at least a part of the height of the ski, the reinforcement elements not being covered laterally by the shell and thus forming the narrow sides of the ski, at least in the binding mounting area of the ski.

46 Claims, 2 Drawing Sheets

OTHER PUBLICATIONS

Photograph C—Cross–sectional view of a second Blizzard ski sample (known to Applicants to be available in the United States in Mar., 1992 (alleged in a German/European Patent Office proceeding to be available in the United States in Mar., 1991).
Photograph D—Cross–sectional view of the Völkl V–19 Vario ski sample (Feb., 1991).
Photograph E—Cross–sectional view of the Völkl "Snow Ranger" (Mar., 1994).
Vö's 1991/1992 ski brochure (Feb., 1991).
Blizzard's "La Technology Prestige Pre–Chassis" brochure (Feb., 1991).
Blizzard's 1994/1995 ski brochure (Feb. 1994).

Blizzard's 1991/1992 ski brochure (Feb. 1991).

Documentation relating to alleged prior art usage and/or knowledge including a Communication to the German Patent Office (GPO) dated May 3, 1995 (from the opposer), Blizzard's "V–Prestige" Pre–ISPO seminar document (Austria) (dated Feb., 1991), an Affidavit of Franz Schenner dated Feb., 1995, an Affidavit of Franz Scherübl dated Oct. 13, 1997 (including an article in "Ski Trading News" dated Feb., 1991).

SHAPED SKI OF NON-RECTANGULAR CROSS SECTION

Matter enclosed in heavy brackets [ ] appears in the original patent but forms no part of this reissue specification; matter printed in italics indicates the additions made by reissue.

BACKGROUND OF THE INVENTION

The present invention relates to a shaped ski of non-rectangular cross section.

It is more and more common to produce shaped skis, that is to say[)], skis of non-rectangular cross section which have a shell forming the upper face and the lateral faces of the ski, these lateral faces possibly being inclined over at least a part of their height. In this case, this inclination can be constant or variable over the length of the ski, and can be brought about by plane or curved surfaces.

It is also advantageous to produce skis comprising a filling core made of synthetic foam material, for example of polyurethane, which has excellent properties of stability over time and is not of great weight.

The advantage of a conventional ski is in particular that it has rigid narrow sides, for example made of ABS or of phenolic laminate, which ensure excellent transmission of the forces exerted by the snow surface on the edges of the ski towards the upper face of the latter which is equipped with the binding for a boot of the skier.

DESCRIPTION OF THE PRIOR ART

Documents FR 2 611 519 and WO 91/08029 describe a ski with a shell, the lateral walls of which are inclined, comprising a core of rectangular cross section, and in which the transmission of the forces between the edges and the upper face is carried out by reinforcement elements situated in contact with the inclined walls and formed for example by sheets of fabric impregnated with resin. The space between the central core and the lateral faces is occupied by a filling material.

Documents FR 2 611 518, FR 2 615 404 and EP 0 394 835 relate to shaped skis, comprising a shell forming the inclined lateral faces of the ski, a core of rectangular cross section, reinforcement elements in contact with the inclined walls, with a space being arranged between the inclined walls and the core, which space is filled with viscoelastic elements which have a vibration-damping property.

The disadvantage of these different solutions derives from the fact that there are no wide elements which ensure direct transmission of the forces from the edges to the upper face which is equipped with the binding because the core is not supported on the edges and the elements for reinforcement of the shell are laid against the inclined sides of the latter and are supported at points on each edge.

The result therefore is skis which have average behavior characteristics and which cannot satisfy the required quality criteria, in particular in competition where the steering accuracy desired for the skis imposes as perfect as possible a transmission of the forces from the edges towards the upper face of the ski.

SUMMARY OF THE INVENTION

The aim of the invention is to provide a shaped ski of non-rectangular cross section, comprising a filling core, for example made of a synthetic foam material, and in particular of polyurethane, the upper face and at least a part of the lateral faces of which are constituted by a shell, in order to have the quality of finish of skis comprising a shell while offering the technical qualities of conventional skis, ensuring at least in the region of the runner direct transmission of the forces from the edges to the upper face of the ski which is equipped with the binding.

To this end, the ski to which the invention relates comprises two longitudinal reinforcement elements which extend at least in the binding mounting area of the ski and are arranged on either side of the core, each reinforcement element comprising a lower face which extends to a great extent over the width of an edge so as to afford it an effective support, and extends over at least a part of the height of the ski, the reinforcement elements not being covered laterally by the shell and thus forming the narrow sides of the ski, at least in the central part of the latter.

In these conditions, this ski comprises, at least in its runner zone, reinforcement elements which form narrow sides and which ensure perfect transmission of the forces from the edges to the upper face of the ski which is equipped with the binding.

Such a ski can be made in different forms.

According to a first embodiment, the reinforcement elements are only present in the central part or runner zone of the ski, are not covered laterally by the shell and thus form the narrow sides of the ski, while the shell alone forms the lateral walls of the ski in the end zones of the latter.

According to a second embodiment, the reinforcement elements extend over a length which is greater than the length of the central part or runner zone of the ski, are not covered laterally by the shell and thus form the narrow sides of the ski over their entire length.

According to a third embodiment, the reinforcement elements extend over a length which is greater than the length of the central part or runner zone of the ski, are not covered laterally by the shell and form the narrow sides of the ski in the central zone of the latter, and are covered laterally by the shell in the zones of the ski situated in front of and behind the runner zone.

One of the faces of each reinforcement element serves, in the runner zone, to support an edge and its opposite face serves to support an edge of the shell.

To this end, the shell can comprise laterally two shoulders which are essentially parallel to the plane of the sole, being supported against two faces of the same orientation comprised by the narrow sides. On the contrary, the narrow sides can themselves each comprise a shaped upper surface serving to support an inclined lateral part of the shell. It is also possible that the upper face of each narrow side serves for embedding one of the edges of the shell.

According to a characteristic of the invention, the height of the lateral parts of the shell is essentially constant over the entire length of the ski, while the height of each narrow side is maximal in the binding mounting area and decreases towards the front and towards the rear respectively.

Moreover, each reinforcement element can have a face, intended to be supported against the core, which is perpendicular to the plane of the sole or, on the contrary, inclined in relation to this perpendicular. Likewise, the external face of each narrow side can be perpendicular to the plane of the sole or inclined in relation to [this perpendicular] *the plane of the sole*.

Each reinforcement can have a base of constant width over the entire length of the ski, the core then having a width which is variable over the length of the ski, or each reinforcement element can even have a base of variable width, while the core has a constant length over the length of the ski.

Each reinforcement element can be monolithic and made of a synthetic material or of wood, or even be made from a number of parts joined end to end in the longitudinal direction, these different parts being made of different materials.

It is important that the central part of each reinforcement element, which is situated in the binding mounting area of the ski, is rigid, it being possible for the end parts to be made of more flexible materials, such as viscoelastic materials having good damping characteristics.

By way of example, the rigid part of each reinforcement element can be made of a multi-material complex, such as ZICRAL, ZICRAL being a registered trademark for an alloy of aluminum and ABS [being] (acrylonitrile-butadiene styrene).

According to the behavior characteristics required for a ski, the two reinforcement elements of one and the same ski can be identical or have different characteristics of rigidity and of damping, or also have different geometric characteristics, such as width and/or height.

According to another characteristic of the invention, the reinforcement elements extend over the entire active length of the ski, that is to say essentially between the front and rear contact zones of the ski on the snow.

The filling core of this ski can be made independently and then assembled with the reinforcement elements and with the shell, or the reinforcement elements can even be first assembled with the shell, after which the core is injected in situ.

BRIEF DESCRIPTION OF THE DRAWINGS

In any case, the invention will be clearly understood with the aid of the following description, with reference to the attached diagrammatic drawings which show, by way of non-limiting examples, a number of embodiments of this ski.

DESCRIPTION OF THE PREFERRED EMBODIMENTS

Figure 1:
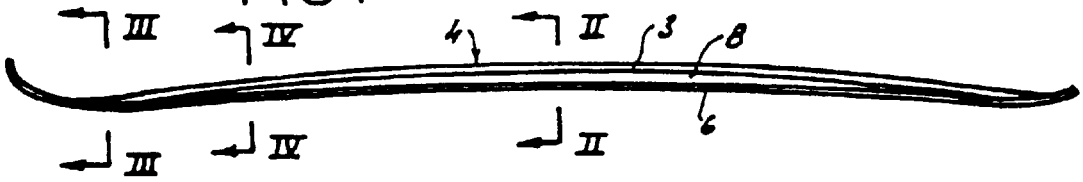
FIG. 1 is a side view of a first ski.
Figure 2:
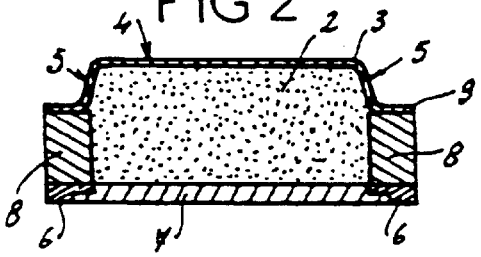
FIGS. 2, 3 and 4 are three views in transverse cross section and on an enlarged scale of this ski according to the lines II—II, III—III and IV—IV in FIG. 1.

The ski shown in FIGS. 1 to 4 comprises a filling core 2 made of synthetic material, for example made of polyurethane foam, a shell 3 forming the upper face 4 of the ski and a part 5 of the lateral faces of the latter, lower longitudinal edges 6 and a sliding sole 7.

According to the essential characteristic of the invention, this ski comprises two longitudinal reinforcement elements 8 which extend over a length which is greater than the binding mounting area and are arranged on either side of the core. Each reinforcement element 8 extends over a large part of the width of an edge 6 and serves as a support for the shell 3 and is not covered laterally by this shell, thus forming the visible narrow sides of the ski.

In the embodiment shown in FIGS. 1 to 4, the shell 3 comprises laterally two shoulders 9 which are essentially parallel to the plane of the sole and are supported against two faces of the same orientation comprised by the narrow sides 8.

Figure 3:
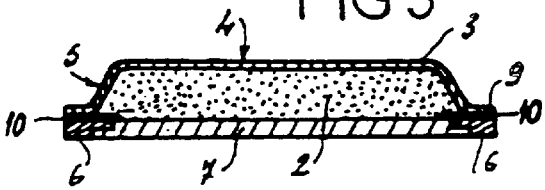
Figure 4:
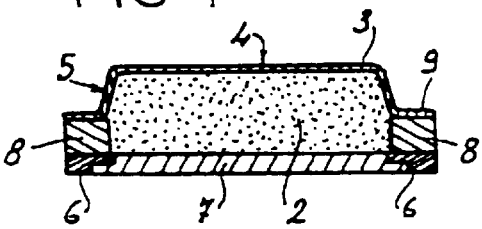

The height of the lateral parts 5 of the shell is essentially constant over the length of the ski, while the height of each narrow side 8 is maximal in the binding mounting area and decreases towards the front and towards the rear respectively to become zero in the ends, as shown in FIG. 3.

In the end zones of the ski, there is provided a band of viscoelastic material 10 between the shell and the edges.

Figure 5:
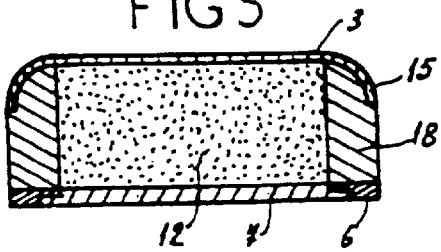
FIGS. 5 to 7 are three views in transverse cross section, corresponding to the view in cross section according to the line II—II in FIG. 1, of three alternative embodiments of this ski.

In the embodiment shown in FIG. 5, each narrow side 18 has, in the binding mounting area of the ski, a height which corresponds essentially to that of the ski and has a shaped upper surface which serves to support an inclined lateral part 15 of the shell, having a complementary shape. In this case, the core 12 has a rectangular shape, the face of each reinforcement element situated in contact with the core being perpendicular to the plane of the sole.

Figure 6:
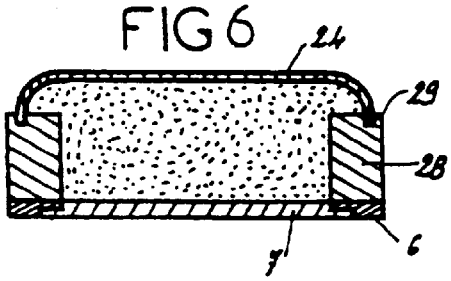

FIG. 6 shows another embodiment of this ski, in which the upper face of each narrow side 28, which is parallel to the plane of the sole, serves for embedding an end of an edge 29 of the shell 24.

Figure 7:
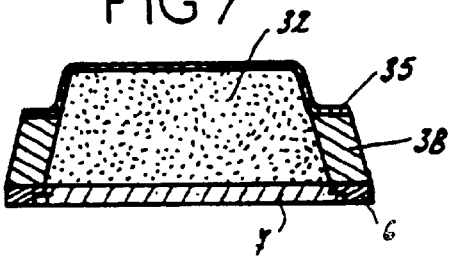

In the embodiment shown in FIG. 7, each reinforcement element 38 has lateral faces, external and internal respectively, the latter being in contact with the core 32, which are inclined in relation to the perpendicular to the plane of the sole. As in the embodiment shown in FIG. 2, the shell comprises laterally two shoulders 35 which are essentially parallel to the plane of the sole and are supported against two faces of the same orientation comprised by the narrow sides 38.

Figure 8:
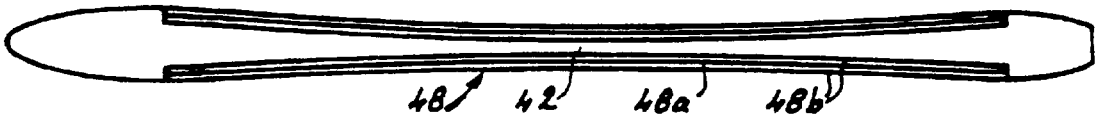
FIG. 8 is a view [f rom] *from* above without shell, showing a possibility for making the reinforcement elements.

FIG. 8 shows a highly diagrammatic view from above of a ski without shell, according to the invention, in which each reinforcement element 48 has a base of constant width over the entire length of the ski. Moreover, each reinforcement element is constituted by a complex of juxtaposed multi-materials, such as a central layer made of ZICRAL 48a, ZICRAL being a registered trademark for an alloy of aluminum, and two lateral layers made of ABS 48b, acrylonitrilebutadine styrene.

Figure 9:
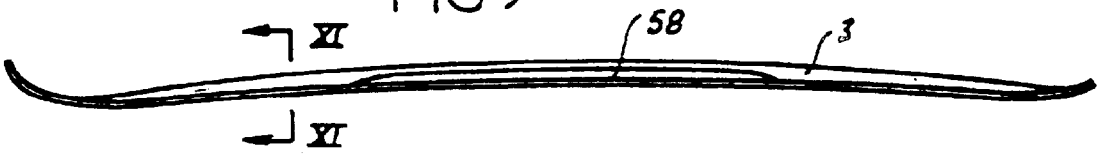
FIG. 9 is a side view of another ski according to the invention.
Figure 10:
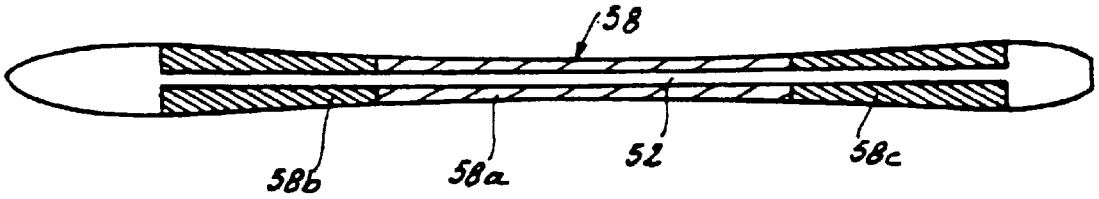
FIG. 10 is a view from above, without shell, showing an embodiment and positioning of the reinforcement elements of the ski.
Figure 11:
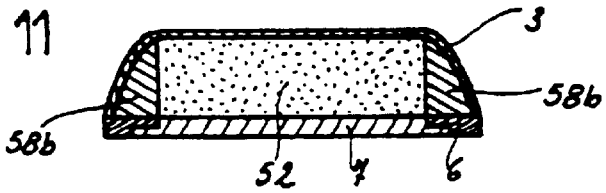
FIG. 11 is a view in transverse cross section and on an enlarged scale of this ski, according to the line XI—XI in FIG. 9.

FIGS. 9 to 11 show another embodiment of this ski, in which the reinforcement elements 58 forming the narrow sides are only visible in the binding mounting area (FIG. 9) and are covered by the shell in the front and rear parts of the ski (FIG. 11).

Each reinforcement element 58 can be made in three parts, namely a central part 58a, a front part 58b and a rear part 58c joined end to end longitudinally. It is important that the central part 58a is made of a strong material, it being possible to make the parts 58b and 58c of, for example, materials having a good damping quality, such as a viscoelastic material. It can also be noted that while, in the embodiment represented in FIG. 8, the core 42 has a width which varies along the ski, in which case the reinforcement elements are of constant width, the core 52 of the ski shown in FIGS. 9 and 10 can have a constant width, in which case the width of the reinforcement elements is variable all along the ski.

As emerges from the above, the invention brings a great improvement to the existing art by providing a ski which combines the aesthetic advantages of skis with a shell and the technical advantages of conventional skis, providing a ski with a shell comprising narrow sides in the binding mounting area.

It goes without saying that the invention is not limited to the embodiments of this ski alone which are described above by way of example, but on the contrary it includes all alternative embodiments. Thus, in particular, the reinforcement elements could extend only in the binding mounting area alone of the ski, or certain of the characteristics, described with reference to one embodiment, could be combined with characteristics described with reference to another embodiment without in so doing departing from the scope of the invention.

We claim:

1. A shaped ski of non-rectangular cross section, comprising:

a core;

a shell having a first portion forming an upper face of the ski and lateral portions forming at least parts of opposed lateral faces of the ski, said shell comprising two laterally disposed shoulders, each shoulder being essentially parallel to a plane of [the] *a central sliding* sole *of the ski*;

a lower face opposite the upper face, said lower face including *the central sliding sole and* longitudinal metal [edged] *edges* disposed on opposed sides of the [lower face and a] central sliding sole; and two longitudinal reinforcement elements extending in at least a binding mounting area of the ski and arranged on opposed sides of the core, each reinforcement element having a bottom surface extending over a second portion of a width of one of the edges, thereby supporting the edge, and an outside surface extending over at least a part of a height of the ski, a third portion of the outside surface of each reinforcement element being free of coverage by the shell, said third portion thereby forming a portion of one of the lateral faces of the ski in at least the binding mounting area of the ski, wherein each of said shoulders is supported by a respective one of said longitudinal reinforcement elements.

2. The ski as claimed in claim 1, wherein the reinforcement elements extend solely in the binding mounting area of the ski, the outside surfaces of the reinforcement elements free of coverage by the shell form portions of the lateral faces of the ski in the binding mounting area of the ski, and the lateral portions of the shell form the lateral faces of the ski in end zones of the ski.

3. The ski as claimed in claim 1, wherein each reinforcement element extends beyond the binding mounting area of the ski, the outside [surfaces] *surface* of each reinforcement element being free of coverage by the shell, whereby each outside surface forms a fourth portion of one of the lateral faces of the ski over substantially [the] *a* length of the ski.

4. The ski as claimed in claim 1, wherein each reinforcement element extends beyond the binding mounting area of the ski, and the outside surfaces of the reinforcement elements free of coverage by the shell are disposed in the binding mounting area of the ski and form *a* portion of the lateral faces of the ski in the binding mounting area, said outside surfaces being covered by the shell in end zones of the ski.

5. The ski as claimed in claim 1, wherein each reinforcement element has an upper surface, the upper surface being arranged to support an edge of the shell.

6. The ski as claimed in claim 3, wherein a height of at least one of the lateral portions of the shell is essentially constant over the length of the ski, and a height of the outside surface of each reinforcement element is maximal in the binding mounting area of the ski and decreases towards a front and towards a rear of the ski, respectively.

7. The ski as claimed in claim 1, wherein each reinforcement element has a height dimension, said height dimension corresponding essentially to [a] *the* height of the ski; the shell includes an inclined lateral portion; and each reinforcement element includes a shaped surface for supporting the inclined lateral portion of the shell.

8. The ski as claimed in claim 1, wherein each reinforcement element has an upper surface and the upper surface includes structure for embedding an edge of the shell.

9. The ski as claimed in claim 1, wherein each reinforcement element has a side surface facing the core, said side surface being perpendicular to a plane of the sole.

10. The ski as claimed in claim 1, wherein each reinforcement element has an inside surface facing the core, said inside [face] *surface* being inclined in relation to a plane perpendicular to a plane of the *central sliding* sole.

11. The ski as claimed in claim 1, wherein each reinforcement element has a base facing the *central sliding* sole, [the] *a* width of the base being constant over [the] *a* length of the ski, and the core has a width which is variable along the length of the ski.

12. The ski as claimed in claim 1, wherein each reinforcement element has a base facing the *central sliding* sole, a width of the base being variable longitudinally along the ski, and the core has a substantially constant width along [the] *a* length of the ski.

13. The ski as claimed in claim 1, wherein each reinforcement element comprises a plurality of parts joined end to end in a longitudinal direction, each part being formed of a material having a physical characteristic different from at least one other part.

14. The ski as claimed in claim 1, wherein each reinforcement element is made from a plurality of juxtaposed parts, at least one of the parts being formed of a material having at least one physical characteristic different from at least one other part.

15. The ski as claimed in claim 1, wherein each reinforcement element comprises a rigid central part situated in [a] *the* binding mounting area and forming a fourth portion of [a] *each said* lateral face of the ski, and two opposed end parts, each end part being formed of a viscoelastic material.

16. The ski as claimed in claim 15, wherein the rigid central part of each reinforcement element comprises a composite material of an aluminum alloy and acrylonitrile-butadiene styrene.

17. The ski as claimed in claim 1, wherein one of the reinforcement elements has rigidity and damping characteristics different from rigidity and damping characteristics of the other reinforcement element.

18. The ski as claimed in claim 1, wherein one of the reinforcement elements has at least one geometric characteristic different from a corresponding geometric characteristic of the other reinforcement element.

19. The ski as claimed in claim 3, wherein the reinforcement elements extend along substantially an entire active length of the ski.

20. The ski as claimed in claim 1, further comprising at least one local joint interposed between the shell and at least one of the edges, said joint comprising a viscoelastic material.

21. A shaped ski of non-rectangular cross section, comprising:

a core;

a shell having a first portion forming an upper face of the ski and lateral portions forming at least parts of opposed lateral faces of the ski;

a lower face opposite the upper face, said lower face including longitudinal metal edges disposed on opposed sides of [the lower face and] a central sliding sole; and two longitudinal reinforcement elements extending in at least a binding mounting area of the ski and arranged on opposed sides of the core, each reinforcement element having a bottom surface extending over a second portion of a width of one of the edges, thereby supporting the edge, and an outside surface extending over at least a part of a height of the ski, wherein each reinforcement element has an upper surface and the upper surface includes structure for embedding an edge of the shell, a third portion of the outside surface of each reinforcement element being free of coverage by the shell, said third portion thereby forming a portion of one of the lateral faces of the ski in at least the binding mounting area of the ski.

22. The ski as claimed in claim 21, wherein the reinforcement elements extend solely in the binding mounting area of the ski, the outside surfaces of the reinforcement elements free of coverage by the shell form portions of the lateral faces of the ski in the binding mounting area of the ski, and the lateral portions of the shell form the lateral faces of the ski in end zones of the ski.

23. The ski as claimed in claim 21, wherein each reinforcement element extends beyond the binding mounting area of the ski, the outside [surfaces] *surface* of each reinforcement element being free of coverage by the shell, whereby each outside surface forms a fourth portion of one of the lateral faces of the ski over substantially [the] *a* length of the ski.

24. The ski as claimed in claim 21, wherein each reinforcement element extends beyond the binding mounting area of the ski, and the outside surfaces of the reinforcement elements free of coverage by the shell are disposed in the binding mounting area of the ski and form portions of the lateral faces of the ski in the binding mounting area, said outside surfaces being covered by the shell in end zones of the ski.

25. The ski as claimed in claim 21, wherein each reinforcement element has an upper surface, the upper surface being arranged to support an edge of the shell.

26. The ski as claimed in claim 23, wherein a height of at least one of the lateral portions of the shell is essentially constant over [the] *a* length of the ski, and a height of the outside surface of each reinforcement element is maximal in the binding mounting area of the ski and decreases towards a front and towards a rear of the ski, respectively.

27. The ski as claimed in claim 21, wherein each reinforcement element has a height dimension, said height dimension corresponding essentially to [a] *the* height of the ski; the shell includes an inclined lateral portion; and each reinforcement element includes a shaped surface for supporting the inclined lateral portion of the shell.

28. The ski as claimed in claim 21, wherein the shell further comprises two laterally disposed shoulders, each shoulder being essentially parallel to the plane of the *central sliding* sole and supported by a respective one of said longitudinal reinforcement elements.

29. The ski as claimed in claim 21, wherein each reinforcement element has a side surface facing the core, said side surface being perpendicular to a plane of the *central sliding* sole.

30. The ski as claimed in claim 21, wherein each reinforcement element has an inside surface facing the core, said inside [face] *surface* being inclined in relation to a plane perpendicular to a plane of the *central sliding* sole.

31. The ski as claimed in claim 21, wherein each reinforcement element has a base facing the *central sliding* sole, [the] *a* width of the base being constant over [the] *a* length of the ski, and the core has a width which is variable along the length of the ski.

32. The ski as claimed in claim 21, wherein each reinforcement element has a base facing the *central sliding* sole, a width of the base being variable longitudinally along the ski, and the core has a substantially constant width along [the] *a* length of the ski.

33. The ski as claimed in claim 21, wherein each reinforcement element comprises a plurality of parts joined end to end in a longitudinal direction, each part being formed of a material having a physical characteristic different from at least one other part.

34. The ski as claimed in claim 21, wherein each reinforcement element is made from a plurality of juxtaposed parts, at least one of the parts being formed of a material having at least one physical characteristic different from at least one other part.

35. The ski as claimed in claim 21, wherein each reinforcement element comprises a rigid central part situated in [a] *the* binding mounting area and forming a fourth portion of a lateral face of the ski, and two opposed end parts, each end part being formed of a viscoelastic material.

36. The ski as claimed in claim 35, wherein the rigid central part of each reinforcement element comprises a composite material of an aluminum alloy and acrylonitrile-butadiene styrene.

37. The ski as claimed in claim 21, wherein one of the reinforcement elements has rigidity and [of] damping characteristics different from rigidity and damping characteristics of the other reinforcement element.

38. The ski as claimed in claim 21, wherein one of the reinforcement elements has at least one geometric characteristic different from a corresponding geometric characteristic of the other reinforcement element.

39. The ski as claimed in claim 23, wherein the reinforcement elements extend along substantially an entire active length of the ski.

40. The ski as claimed in claim 21, further comprising at least one local joint interposed between the shell and at least one of the edges, said joint comprising a viscoelastic material.

*41. A shaped ski of non-rectangular cross section, comprising:*

*a core;*

*a shell having a top portion forming an upper face of the ski and lateral portions forming at least parts of opposed lateral faces of the ski, said shell further including two laterally disposed shoulders, each shoulder being essentially parallel to a plane of a central sliding sole of the ski;*

*a lower face opposite the upper face, said lower face including the central sliding sole and longitudinal metal edges disposed on opposed sides of the central sliding sole; and*

*two longitudinal reinforcement elements extending in at least a binding mounting area of the ski and arranged on opposite sides of the core, each reinforcement element having a bottom surface extending over a portion of a width of one of the edges, thereby supporting the edge, and an outside surface extending over at least a part of a height of the ski, a portion of the outside surface of each reinforcement element being free of coverage by the shell to thereby form a portion of a respective one of the lateral faces of the ski in at least the binding mounting area of the ski, wherein each of said shoulders is supported by a respective one of said longitudinal reinforcement elements, and wherein a cross-sectional height of each of the two longitudinal reinforcement elements varies along a longitudinal axis of the ski.*

*42. A shaped ski of non-rectangular cross section, comprising:*

*a main ski body section including front and rear ends and a binding mounting area between the front and rear ends, said front and rear ends and said binding mounting area extending along a longitudinal axis;*

*a core extending along the longitudinal axis;*

*a shell having a top portion forming an upper face of the ski and lateral portions forming at least parts of opposed lateral faces of the ski, said shell further including two laterally disposed shoulders, each shoulder being essentially parallel to a plane of a central sliding sole of the ski, said shell defining an upper face having a width, as measured in a direction transverse to the longitudinal axis, that increases from the binding mounting area towards the front and rear ends;*

*a lower face opposite the upper face, said lower face including the central sliding sole and longitudinal metal edges disposed on opposed sides of the central sliding sole; and*

*two longitudinal reinforcement elements extending in at least the binding mounting area of the ski and arranged on opposite sides of the core, each reinforcement element having a bottom surface extending over a portion of a width of one of the edges, thereby supporting the edge, and an outside surface extending over at least a part of a height of the ski, a portion of the outside surface of each reinforcement element being free of coverage by the shell to thereby form a portion of a respective one of the lateral faces of the ski in at least the binding mounting area of the ski, wherein each of said shoulders is supported by a respective one of said longitudinal reinforcement elements.*

*43. A shaped ski of non-rectangular cross section, comprising:*

*a core;*

*a shell having a top portion forming an upper face of the ski and lateral portions forming at least parts of opposed lateral faces of the ski, said shell further including two laterally disposed shoulders each shoulder being essentially parallel to a plane of a central sliding sole of the ski;*

*a lower face opposite the upper face, said lower face including the central sliding sole and longitudinal metal edges disposed on opposed sides of the central sliding sole; and*

*two longitudinal reinforcement elements extending along a longitudinal axis in at least a binding mounting area of the ski and arranged on opposite sides of the core, each reinforcement element having a bottom surface extending over a portion of a width of one of the edges, thereby supporting the edge, and an outside surface extending over at least a part of a height of the ski, a portion of the outside surface of each reinforcement element being free of coverage by the shell to thereby form a portion of a respective one of the lateral faces of the ski in at least the binding mounting area of the ski, wherein each of said shoulders is supported by a respective one of said longitudinal reinforcement elements, and wherein the two longitudinal reinforcement elements follow a contour of the ski along the longitudinal axis.*

*44. A shaped ski of non-rectangular cross section, comprising:*

*a core;*

*a shell having a top portion forming an upper face of the ski and lateral portions forming at least parts of opposed lateral faces of the ski, said shell further including two laterally disposed shoulders, each shoulder being essentially parallel to a plane of a central sliding sole of the ski;*

*a lower face opposite the upper face, said lower face including the central sliding sole and longitudinal metal edges disposed on opposed sides of the central sliding sole; and*

*two longitudinal reinforcement elements extending in at least a binding mounting area of the ski and arranged on opposite sides of the core, each reinforcement element having a bottom surface extending over a portion of a width of one of the edges, thereby supporting the edge, and an outside surface extending over at least a part of a height of the ski, a portion of the outside surface of each reinforcement element being free of coverage by the shell to thereby form a portion of a respective one of the lateral faces of the ski in at least the binding mounting area of the ski, wherein each of said shoulders is supported by a respective one of said longitudinal reinforcement elements and each of the lateral faces of the shell defines a plane that passes through the respective reinforcement element and is directly aligned with the edges so as to achieve direct transmission of forces from the upper face of the shell to the edges.*

*45. A shaped ski of non-rectangular cross section, comprising:*

*a core;*

*a shell having a top portion forming an upper face of the ski and lateral portions forming at least parts of opposed lateral faces of the ski, the core extending upwardly into the shell between the lateral portions, said shell further including two laterally disposed shoulders, each shoulder being essentially parallel to a plane of a central sliding sole of the ski;*

*a lower face opposite the upper face, said lower face including the central sliding sole and longitudinal metal edges disposed on opposed sides of the central sliding sole; and*

*two longitudinal reinforcement elements extending in at least a binding mounting area of the ski and arranged on opposite sides of the core, each reinforcement element having a bottom surface extending over a portion of a width of one of the edges, thereby supporting the edge, and an outside surface extending over at least a part of a height of the ski, a portion of the outside surface of each reinforcement element being free of coverage by the shell to thereby form a portion of a*

*respective one of the lateral faces of the ski in at least the binding mounting area of the ski, wherein each of said shoulders is supported by a respective one of said longitudinal reinforcement elements.*

*46. A shaped ski of non-rectangular cross section, comprising:*

*a core;*

*a shell having a top portion forming an upper face of the ski and lateral portions forming at least parts of opposed lateral faces of the ski, said shell further including two laterally disposed shoulders, each shoulder being essentially parallel to a plane of a central sliding sole of the ski;*

*a lower face opposite the upper face, said lower face including the central sliding sole and longitudinal metal edges disposed on opposed sides of the central sliding sole; and*

*two longitudinal reinforcement elements extending in at least a binding mounting area of the ski and arranged on opposite sides of the core, each reinforcement element having a bottom surface extending over a portion of a width of one of the edges, thereby supporting the edge, and an outside surface extending over at least a part of a height of the ski, a portion of the outside surface of each reinforcement element being free of coverage by the shell to thereby form a portion of a respective one of the lateral faces of the ski in at least the binding mounting area of the ski, wherein each of said shoulders is supported by a respective one of said longitudinal reinforcement elements, and wherein the shoulders have a constant width along an entire length of the ski.*

* * * * *

UNITED STATES PATENT AND TRADEMARK OFFICE

CERTIFICATE OF CORRECTION

PATENT NO. : Re. 36,586
DATED : February 29, 2000
INVENTOR(S) : Roger Abondance, Jean Bauvois, Jean-Marc Forneri It is certified that error appears in the above-identified patent and that said Letters Patent is hereby corrected as shown below:

Title page, item
[30] Foreign Application Priority Data

Change "Nov. 19, 1991 [JP] Japan . . . . . 3-14750" to "Nov. 19, 1991 [FR] France . . . . . .91-14750--.

Attorney, Agent, or Firm

Change "Oliff & Berridg, PLC" to -- Oliff & Berridge, PLC--.

[56] References Cited, OTHER PUBLICATIONS

Page 2, column 1, line 10, change "Vö's 1991/1992 ski brochure (Feb., 1991)" to --Völkl's 1991/1992 ski brochure (Feb., 1991)--.

Column 2, line 65, after "reinforcement" insert --element--.

Claim 43, line 7 (column 9, line 57), add --,-- after "shoulders".

Signed and Sealed this

Twenty-seventh Day of February, 2001

*Attest:*

Nicholas P. Godici

NICHOLAS P. GODICI

*Attesting Officer* *Acting Director of the United States Patent and Trademark Office*